US012644539B2

(12) United States Patent
Ye et al.

(10) Patent No.: US 12,644,539 B2
(45) Date of Patent: Jun. 2, 2026

(54) FAUCET WITH GEAR LINKAGE MECHANISM

(71) Applicant: AS America, Inc., Piscataway, NJ (US)

(72) Inventors: Xiaojing Ye, Edison, NJ (US); Weijian Zhang, Guangzhou (CN)

(73) Assignee: AS America, Inc., Piscataway, NJ (US)

( * ) Notice: Subject to any disclaimer, the term of this patent is extended or adjusted under 35 U.S.C. 154(b) by 110 days.

(21) Appl. No.: 18/608,467

(22) Filed: Mar. 18, 2024

(65) Prior Publication Data

US 2024/0328532 A1 Oct. 3, 2024

(30) Foreign Application Priority Data

Mar. 31, 2023 (WO) ................ PCT/CN2023/085533

(51) Int. Cl.
| | |
|---|---|
| *F16K 31/53* | (2006.01) |
| *E03C 1/02* | (2006.01) |
| *E03C 1/04* | (2006.01) |
| *F16K 11/00* | (2006.01) |

(52) U.S. Cl.
CPC .............. *F16K 31/535* (2013.01); *E03C 1/04* (2013.01); *F16K 19/006* (2013.01); *E03C 2001/026* (2013.01)

(58) Field of Classification Search
CPC ................................. E03C 1/0412; E03C 1/04
See application file for complete search history.

(56) References Cited

U.S. PATENT DOCUMENTS

| | | | |
|---|---|---|---|
| 1,884,102 A | 10/1932 | Hugo | |
| 3,396,749 A | 8/1968 | Troutman | |
| 2008/0111090 A1* | 5/2008 | Schmitt | .................. F16K 31/05 |
| | | | 251/129.03 |
| 2018/0353376 A1* | 12/2018 | Perrin | ........................ E03C 1/04 |
| 2020/0270852 A1* | 8/2020 | Manga | ..................... E03C 1/04 |
| 2023/0287983 A1* | 9/2023 | Lee | ........................ E03C 1/0412 |

FOREIGN PATENT DOCUMENTS

| | | | |
|---|---|---|---|
| CN | 203571115 U | * | 4/2014 |
| CN | 212407747 U | * | 1/2021 |
| EP | 1710480 A2 | | 10/2006 |

* cited by examiner

*Primary Examiner* — Christine J Skubinna
(74) *Attorney, Agent, or Firm* — Morrison & Foerster LLP

(57) ABSTRACT

Provided herein is a dual control faucet system comprising: a cold water control system housed within a cold water control and comprising a first bevel gear; a hot water control system housed within a hot water control and comprising a second bevel gear; and a faucet body; wherein the cold water control system is connected to a cold water spindle via a pair of bevel gears and the hot water control system is connected to a hot water spindle via a pair of bevel gears, wherein, when the cold water control receives an input from a user, the pair of bevel gears rotate such that the cold water spindle rotates to control a flow of cold water, and wherein, when the hot water control receives an input from a user, the pair of bevel gears rotate such that the hot water spindle rotates to control a flow of hot water.

15 Claims, 4 Drawing Sheets

100

104A

102

104B

130

106A

106B

FAUCET WITH GEAR LINKAGE MECHANISM

CROSS-REFERENCE TO RELATED APPLICATIONS

This application claims the priority of International Application No. PCT/CN2023/085533, filed Mar. 31, 2023, the entire contents of which is incorporated herein by reference.

FIELD

The present disclosure generally relates to faucet systems, and more particularly, to faucet systems having a gear linkage mechanism between the temperature controls and the valve assembly.

BACKGROUND

Conventional dual control faucet systems include two separate controls (e.g., handles). One control is configured to control the amount of hot water and one control is configured to control the amount of cold water. The controls can be manipulated or controlled by a user to achieve a desired temperature of the water that is dispensed from an outlet of the faucet body of the faucet system. Typically, a cartridge is positioned within a body of each control. When a user manipulates the hot water control (e.g., turns the handle), it directly causes the cartridge within the body of the hot water control to rotate. Rotation of the cartridge allows more hot water or less hot water to enter the cartridge, depending on the direction of rotation. Similarly, when a user manipulates the cold water control (e.g., turns the handle), it directly causes the cartridge within the body of the cold water control to rotate. Rotation of the cartridge allows more cold water or less cold water to enter the cartridge, depending on the direction of the rotation. The hot water and the cold water are then combined in a mixing chamber to form mixed temperature water, which flows to the faucet body and is dispensed from an outlet of the faucet body.

SUMMARY

Provided herein are dual control faucet systems comprising a gear linkage mechanism between each of the temperature controls and the valve assembly. The dual control faucet systems include a valve assembly configured to be located below a deck to which the faucet system is configured to mount. To control the valve assembly, each temperature control of the dual control faucet system is coupled to a spindle of the valve assembly via a gear linkage mechanism. The gear linkage mechanism allows the valve assembly to be positioned below the deck and not within a body of the temperature controls.

As described above, conventional dual control faucet systems include a cartridge including a spindle in each of the controls, such that the spindle/cartridge is directly coupled to the control and rotates as a user turns/rotates the control. This positioning allows a user relatively easy access to the valve assembly, which can make it easier to service the valve assembly. However, many users switch out their faucet for purely aesthetic purposes. Accordingly, the dual control faucet systems provided herein have separated the trim portion of the faucet system from the valve assembly portion of the faucet system to allow a user to more easily swap out the trim portion (i.e., the visible exterior portion of the faucet system) without having to handle the working components (e.g., the valve assembly) of the faucet system. In some embodiments, the trim portion can include a faucet body and the bodies of each of the dual controls.

Specifically, the dual control faucet system described herein includes a valve assembly configured to be positioned below a mounting surface to which the faucet system is configured to be mounted. The trim portion of the faucet is configured to be mounted above the mounting surface. Each control is connected to a first bevel gear, and each spindle of the valve assembly is connected to a second bevel gear. When a user manipulates (e.g., turns) the cold water control, it causes the first bevel gear of the cold water control to turn. The first bevel gear of the cold water control is linked to or in mesh with the second bevel gear of the cold water control at a 90 degree angle. When the first bevel gear turns, it causes the second bevel gear to turn. Because the second bevel gear is linked to the cold water spindle of the valve assembly, the rotation of the second bevel gear causes the cold water spindle to open or close, depending on the direction of rotation. Therefore, the rotation of the cold water control causes rotation of the cold water spindle via a gear linkage mechanism comprising a first bevel gear and a second bevel gear.

Similarly, when a user manipulates (e.g., turns) the hot water control, it causes the first bevel gear of the hot water control to turn. The first bevel gear of the hot water control is linked to the second bevel gear of the hot water control at a 90 degree angle. When the first bevel gear turns, it causes the second bevel gear to turn. Because the second bevel gear is linked to the hot water spindle of the valve assembly, the rotation of the second bevel gear causes the hot water spindle to open or close, depending on the direction of rotation. Therefore, the rotation of the hot water control causes rotation of the hot water spindle via a gear linkage mechanism comprising a first bevel gear and a second bevel gear.

Because only the faucet trim is located above the deck when the faucet system is installed to the mounting surface and not the valve assembly, it allows a user to easily remove and replace the faucet trim without having to also adjust (e.g., uninstall, reinstall) the valve assembly of the faucet system. This configuration can enable a user to more easily swap out the faucet for a different faucet design as compared to that of a conventional dual control faucet system with the valve assembly located within the faucet trim (i.e., the body of the controls).

In some embodiments, provided is a dual control faucet system comprising a cold water control comprising a cold water control system housed within the cold water control, wherein the cold water control system comprises a first bevel gear; a hot water control comprising a hot water control system housed within the hot water control, wherein the hot water control system comprises a second bevel gear; a faucet body; and a valve assembly comprising a third bevel gear coupled to a cold water spindle and a fourth bevel gear coupled to a hot water spindle, wherein the first bevel gear is meshed with the third bevel gear and the second bevel gear is meshed with the fourth bevel gear, wherein, when the cold water control receives an input from a user, the cold water control causes the first bevel gear to rotate, causing the third bevel gear to rotate, such that the cold water spindle rotates in an opening direction or in a closing direction to control a flow of cold water from a cold water supply and into a cold water cartridge of the valve assembly, and wherein, when the hot water control receives an input from a user, the hot water control causes the second bevel gear to rotate, causing the fourth bevel gear to rotate, such that the hot water spindle rotates in an opening direction or in a closing direction to control a flow of hot water from a hot water supply and into a hot water cartridge of the valve assembly.

In some embodiments of the dual control faucet system, the first bevel gear and the second bevel gear are configured to rotate around a vertical axis and the second bevel gear and the fourth bevel gear are configured to rotate around a horizontal axis.

In some embodiments of the dual control faucet system, the horizontal axis of rotation of the third bevel gear and the horizontal bevel gear of the fourth bevel gear are the same.

In some embodiments of the dual control faucet system, when the dual control faucet system is mounted to a mounting surface, the valve assembly is located below the mounting surface.

In some embodiments of the dual control faucet system, the cold water control system comprises a connector coupled at a first end to an interior surface of the cold water control and at a second end to the first bevel gear.

In some embodiments of the dual control faucet system, the hot water control system comprises a connector coupled at a first end to an interior surface of the hot water control and at a second end to the second bevel gear.

In some embodiments of the dual control faucet system, the cold water spindle is configured to rotate around a horizontal axis and the hot water spindle is configured to rotate around a horizontal axis, wherein the horizontal axis of rotation of the cold water spindle and the horizontal axis of rotation of the hot water spindle are the same.

In some embodiments of the dual control faucet system, at least a portion of the cold water spindle and a portion of the hot water spindle are positioned within a manifold.

In some embodiments of the dual control faucet system, the manifold is configured to be detachably connected to a cold water supply and a hot water supply.

In some embodiments of the dual control faucet system, the manifold comprises a mixing chamber configured to receive cold water from the cold water cartridge and hot water from the hot water cartridge to form mixed temperature water and an outlet, wherein the outlet is configured to be removably coupled to a base of the faucet body and deliver the mixed temperature water to the faucet body.

In some embodiments of the dual control faucet system, when the dual control faucet system is mounted to a mounting surface, the manifold is configured to be located partially above an upper surface of the mounting surface and partially below a lower surface of the mounting surface.

In some embodiments of the dual control faucet system, the outlet of the manifold is configured to removably connect to the base of the faucet body via a separate connector.

In some embodiments of the dual control faucet system, the manifold comprises an engineering thermoplastic.

In some embodiments of the dual control faucet system, a diameter of the first bevel gear is the same as a diameter of the third bevel gear, and a diameter of the second bevel gear is the same as a diameter of the fourth bevel gear.

In some embodiments of the dual control faucet system, a diameter of the first bevel gear is the same as a diameter of the second bevel gear, and a diameter of the third bevel gear is the same as a diameter of the fourth bevel gear.

In some embodiments, any one or more of the features, characteristics, or elements discussed above with respect to any of the embodiments may be incorporated into any of the other embodiments mentioned above or described elsewhere herein.

DETAILED DESCRIPTION

Described herein are dual control faucet systems that include a gear linkage mechanism connecting each control with its respective spindle of the valve assembly. Specifically, when the dual control faucet systems described herein are mounted to a deck, the valve assembly of the dual control faucet system is positioned below the deck and the faucet trim is positioned above the deck. This configuration can allow a user to more easily swap out the faucet trim of the dual control faucet system to change the aesthetic of the faucet, for example, without having to remove or otherwise handle the working components (e.g., valve assembly) of the faucet system. This configuration can not only make it easier for a user to replace the faucet trim, but it can also reduce waste, since it allows the valve assembly to remain in place (and not have to be removed and replaced) when a new faucet trim is installed.

Because the current dual control valve assembly includes a valve assembly that is physically removed from the controls as compared to a conventional dual control valve assembly, a gear mechanism has been implemented to allow the hot water control to control the hot water spindle, and the cold water control to control the cold water spindle. Specifically, a bevel gear assembly is used such that when a user turns the cold water control, the cold water control causes the bevel gear assembly to rotate, which in turn causes the cold water spindle to open or close. The bevel gear assembly also enables a user to open or close the hot water spindle just by rotating the hot water control.

In some embodiments, a bevel gear coupled to a water control (i.e., the cold water control or the hot water control) is positioned at a 90 degree angle to a separate bevel gear coupled to a spindle (i.e., the cold water spindle or the hot water spindle). The axis of rotation of each of the water controls runs perpendicular to the axis of rotation of each of the spindles.

Figure 1A:
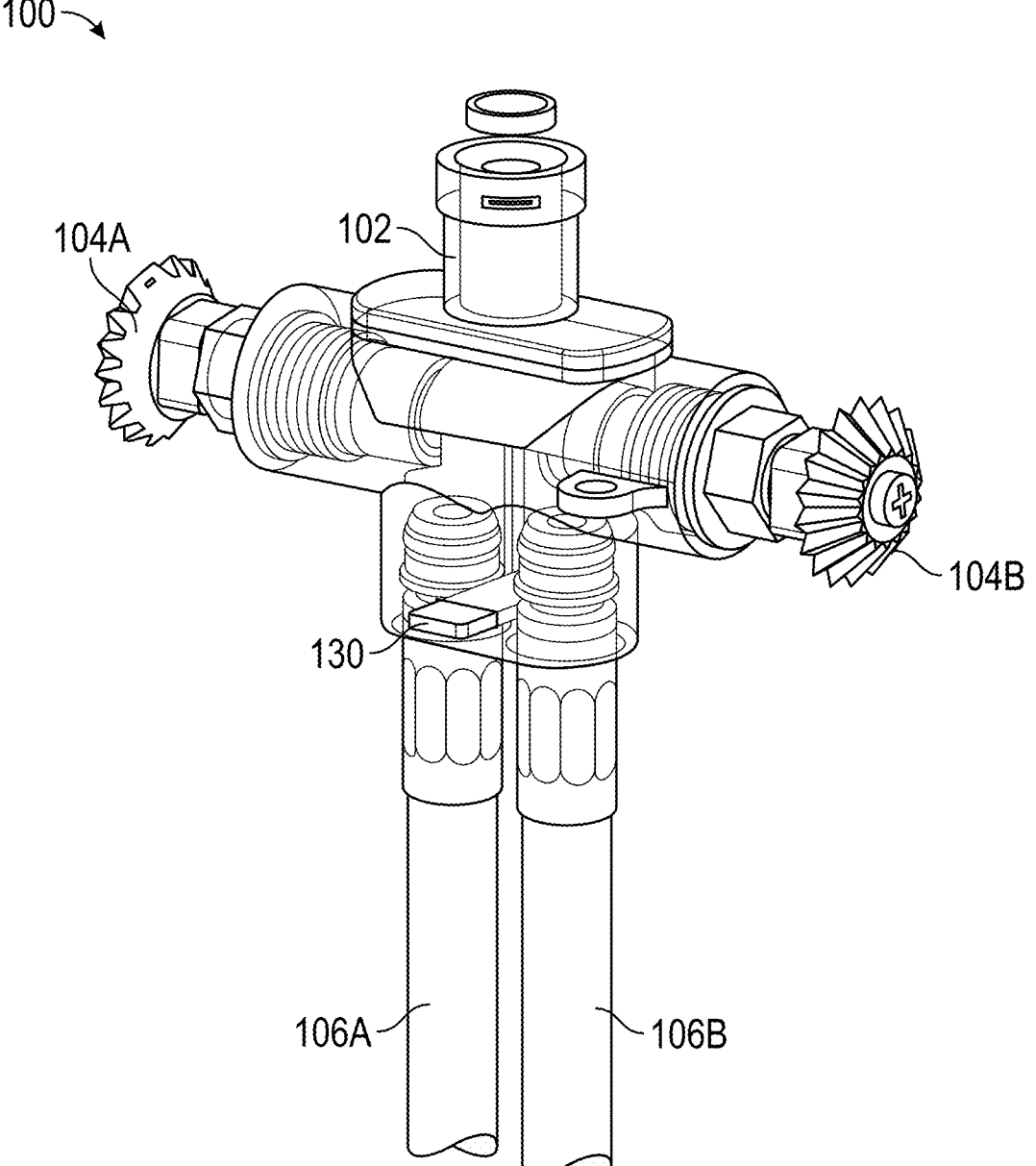
FIG. 1A shows a perspective view of a valve assembly of a dual control faucet system, according to some embodiments described herein.

FIG. 1A shows a perspective view of a valve assembly 100 of a dual control faucet system, according to some embodiments described herein. As shown, valve assembly 100 includes manifold 102, two bevel gears (104A for the cold water spindle and 104B for the hot water spindle), cold water supply 106A, and hot water supply 106B. In some embodiments, 106B may be the cold water supply and 106A may be the hot water supply. FIG. 1A also shows rotatable ceramic disk 122 of the cold water valve (and connected to the cold water spindle) clip 130 configured to hold cold water supply 106A and hot water supply 106B in place.

The cold water bevel gear 104A is connected to a cold water spindle. The cold water spindle is positioned at least partially within manifold 102. Cold water supply 106A is fluidly coupled to the cold water spindle in the manifold 102.

FIG. 1A only shows a valve assembly 100 within a manifold, which is just one portion of a dual control faucet system. When the valve assembly 100 is integrated into a dual control faucet system, it is installed such that a hot water control (e.g., handle) of the faucet system can control the hot water bevel gear 104B and the hot water spindle, and the cold water control (e.g., handle) of the faucet system can control the cold water bevel gear 104A and the cold water spindle. As a user turns or rotates the cold water control of the faucet system, the rotation of the cold water control causes the cold water bevel gear 104A to turn. Because the cold water bevel gear is mechanically coupled to the cold water spindle, the rotation of the cold water control of the faucet system causes the cold water spindle located within the manifold 102 to rotate. Rotation of the cold water spindle causes it to open or close, depending on the direction of rotation. If the cold water spindle is rotated in an opening direction, it will cause more water from the cold water supply 106A to enter the cartridge. If the cold water spindle is rotated in a closing direction, it will cause less water from the cold water supply 106A to enter the cartridge. The cold water spindle is configured to rotate between a fully open position and a fully closed position. When in a fully closed position, no cold water may enter the cold water cartridge from the cold water supply 106A. When in a fully open position, a maximum amount of cold water may enter the cold water cartridge from the cold water supply 106A. the cold water spindle may be adjusted to any position between a fully closed position and a fully open position based on the positioning of the cold water control of the faucet system.

Similarly, the hot water bevel gear 104B is connected to a hot water spindle. The hot water spindle is also located at least partially within the manifold 102. The hot water supply 106B is fluidly coupled to the hot water spindle located within the manifold. When the valve assembly 100 is integrated into a complete dual control faucet system, a hot water control (e.g., handle) of the faucet system is connected to the hot water spindle located within the manifold. As a user manipulates or turns/rotates the hot water control, it causes the hot water bevel gear 104B to rotate as well. Because the hot water bevel gear 104B is mechanically coupled to a hot water spindle (located within the manifold 102), the rotation of the hot water bevel gear 104B causes rotation of the hot water spindle. The user can therefore, by rotating the hot water control, cause the rotation of the hot water spindle. Depending on the direction of the rotation of the hot water spindle, the hot water spindle may be rotated in a closing direction or in an opening direction. As the hot water spindle is rotated in a closing direction, it will cause less water to enter the hot water cartridge from the hot water supply 106B. As the hot water spindle is rotated in an opening direction, it will cause more water to enter the hot water cartridge from the hot water supply 106B. The hot water spindle may also be rotated between a fully open position and a fully closed position. When in a fully closed position, no hot water can enter the hot water spindle from the hot water supply 106B. when in a fully open position, a maximum amount of hot water can enter the hot water cartridge from the hot water supply 106B. The user can control the positioning of the hot water spindle to any position between its fully closed position and its fully open position.

In some embodiments, manifold 102 may comprise a thermoplastic, such as an injection molded engineering thermoplastic (e.g. glass-filled PPS or PPA). Engineering thermoplastics include for example polyamides, polyesters, polycarbonates, acrylonitrile-butadiene-styrene, polysulfones (PSU), polyethersulfones (PESU), cyclic olefin copolymer (COC), acrylonitrile-styrene-acrylate (ASA), polyphenylene oxides (PPO), polyphenylene sulfides (PPS), polyphenylenesulfones (PPSU), polyether ether ketones (PEEK), polyethylenimine (PEI), polyphthalamides (PPA), polyacetals, copolymers thereof, and blends thereof. Polyamides include nylon and polyphthalamide (PPA). Polyacetals include polyoxymethylene (POM). In some embodiments, a thermoplastic polymer may comprise a glass-filled thermoplastic, for example a glass-filled polyamide. Parts comprising a thermoplastic may be prepared via a molding process, for example injection molding.

Figure 1B:
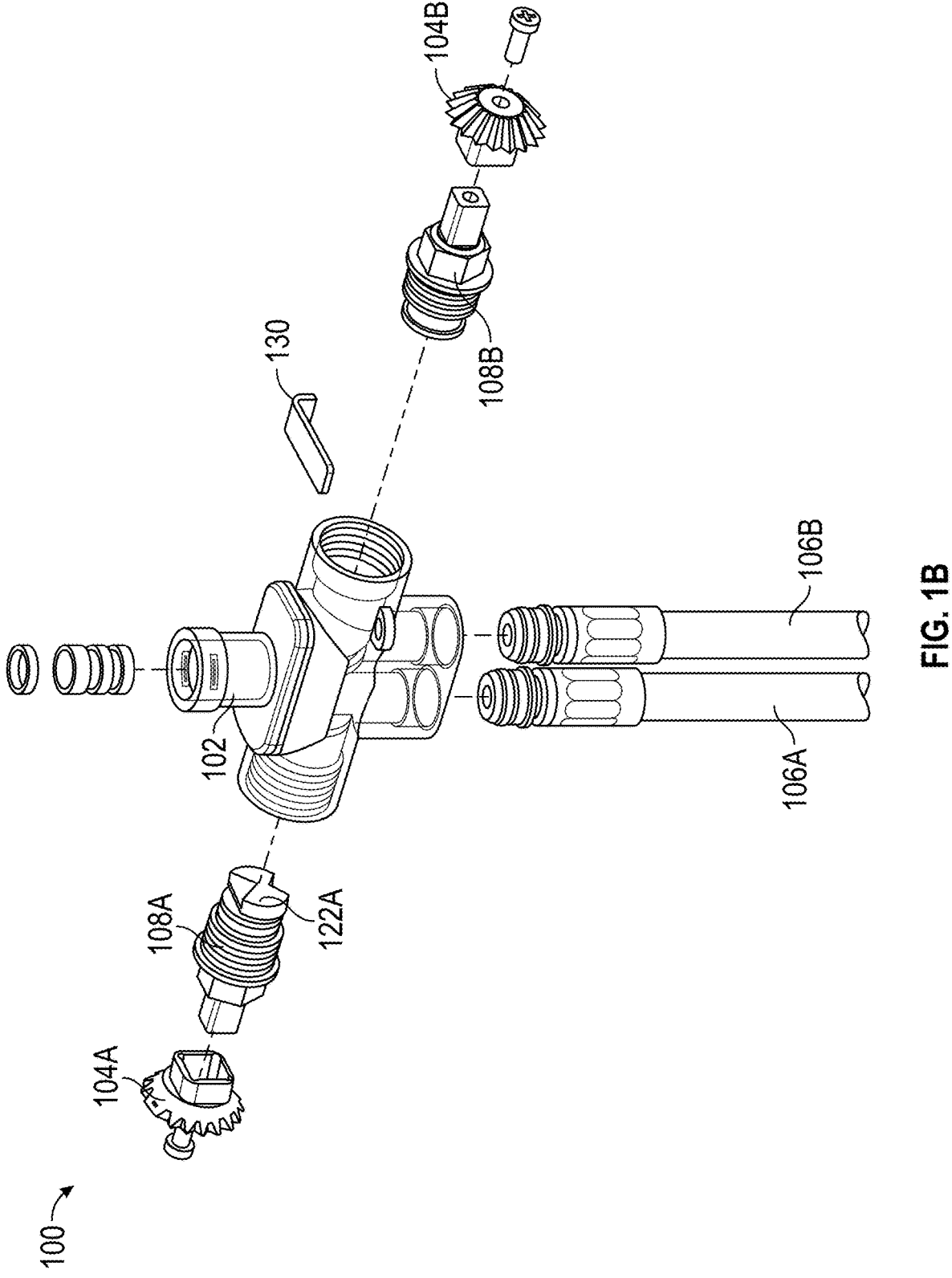
FIG. 1B shows an exploded view of a valve assembly of a dual control faucet system, according to some embodiments described herein.

FIG. 1B shows an exploded view of a valve assembly 100 of a dual control faucet system, according to some embodiments described herein. As shown, valve assembly 100 of FIG. 1B includes a manifold 102, a cold water bevel gear 104A, a hot water bevel gear 104B, a cold water supply 106A, a hot water supply 106B, a cold water spindle 108A, a hot water spindle 108B, and clip 130. Valve assembly 100 of FIG. 1B may include any features of valve assembly 100 of FIG. 1A.

Valve assembly 100 and manifold 102 are configured to be installed along with a faucet trim to form a dual control faucet system. The faucet trim can include a faucet body and two control bodies (i.e., a hot water control body and a cold water control body). When installed to a mounting surface, valve assembly 100 is configured to be mounted below the deck. The faucet trim portion of the dual control faucet system is configured to be mounted above the deck. By positioning the valve assembly 100 outside of the faucet trim and below the deck, a user can more easily uninstall the faucet trim and install a new faucet trim. Conversely, if the valve assembly 100 is located within the body of the faucet trim, as is the case with conventional dual control faucet systems, it makes it more difficult and cumbersome to uninstall the faucet and replace with a new faucet, since the valve assembly of the faucet system would also need to be removed and replaced. This increases the time, materials cost, labor cost, and waste (since the valve assembly would need to be replaced).

As shown, a cold water bevel gear 104A is mechanically coupled to a cold water spindle 108A. For example, the cold water bevel gear 104A may be mechanically coupled to the cold water spindle 108A via a screw. The cold water spindle 108A, when installed, is located within the manifold 102. However, the cold water bevel gear 104A is positioned just outside of the manifold 102 when mechanically coupled to the cold water spindle 108A. The cold water supply 106A is removably coupled to the manifold 102.

Similarly, a hot water bevel gear 104B is mechanically coupled to a hot water spindle 108A. In some embodiments, the hot water bevel gear 104B may be mechanically coupled to the hot water spindle 108A via a screw. The hot water spindle 108A, when installed, is positioned within the manifold 102. The hot water bevel gear 104B is positioned just outside the manifold when mechanically coupled to the hot water spindle 108B. The hot water supply 106B is removably coupled to the manifold 102.

When a user provides an input to the cold water control of the dual control faucet system (e.g., turns, rotates), it causes the cold water bevel gear 104A to rotate along a horizontal axis. Because the cold water bevel gear 104A is mechanically coupled to the cold water spindle 108A, the rotation along the horizontal axis causes the cold water spindle 108A to rotate. In some embodiments, the cold water spindle 108A rotates along the same horizontal axis as the cold water bevel gear 104A. The rotation of the cold water spindle 108A controls the amount of cold water that enters the cold water cartridge from the cold water supply 106A. From the cold water cartridge, the cold water flows to a mixing chamber where it may mix with hot water from the hot water supply 106B and the hot water cartridge. The cold water spindle 108A is configured to be rotated in an opening direction, which can increase the amount of water flow from the cold water supply 106A into the manifold 102 and into the cold water cartridge. The cold water spindle 108A is also configured to be rotated in a closing direction, which can decrease the amount of water flow from the cold water supply 106A into the manifold 102 and into the cold water cartridge. An increase in cold water flowing into the cold water cartridge will cause the temperature of the mixed water formed in the mixing chamber to decrease, and a decrease of cold water flowing into the cold water cartridge will cause the temperature of the mixed water formed in the mixing chamber to increase.

When a user provides an input to the hot water control of the dual control faucet system (e.g., turns, rotates), it causes hot water bevel gear 104B to rotate along a horizontal axis. The hot water bevel gear 104B is mechanically coupled to the hot water spindle 108B such that the rotation of the hot water bevel gear 104B causes rotation of the hot water spindle 108B. The hot water spindle 108B can also rotate along a horizontal axis. In some embodiments, the horizontal axis of rotation of the hot water bevel gear 104B and the horizontal axis of rotation of the hot water spindle 108B may be the same axis. The rotation of the hot water spindle 108B controls the amount of water that flows from the hot water supply 106B into the manifold 102 and into the hot water cartridge. From the hot water cartridge, the hot water can flow to a mixing chamber where it mixes with cold water from the cold water cartridge to form mixed temperature water. The hot water spindle 108B is configured to be rotated in both an opening direction and a closing direction. When rotated in an opening direction, the hot water spindle 108B will cause more hot water to flow into hot water cartridge and manifold 102 from hot water supply 106B. An increase in hot water will also increase the temperature of the mixed water formed in the mixing chamber. When rotated in a closing direction, the hot water spindle 108B will cause less hot water to flow into hot water cartridge and manifold 102 from hot water supply 106B. A decrease in hot water will also cause the temperature of the mixed water formed in the mixing chamber to decrease.

The hot water from the hot water cartridge and the cold water from the cold water cartridge can flow from the spindles and to a mixing chamber. In some embodiments, the mixing chamber is located within the manifold 102. The cold water and hot water mix together in the mixing chamber to form mixed temperature water. The relative temperature of the mixed water can be controlled by a user by turning or rotating (or otherwise manipulating) the hot and cold water controls of the dual control faucet system. From the mixing chamber, the mixed temperature water flows to the faucet body of the dual control faucet system and is dispensed from an outlet of the faucet body.

Figure 2:
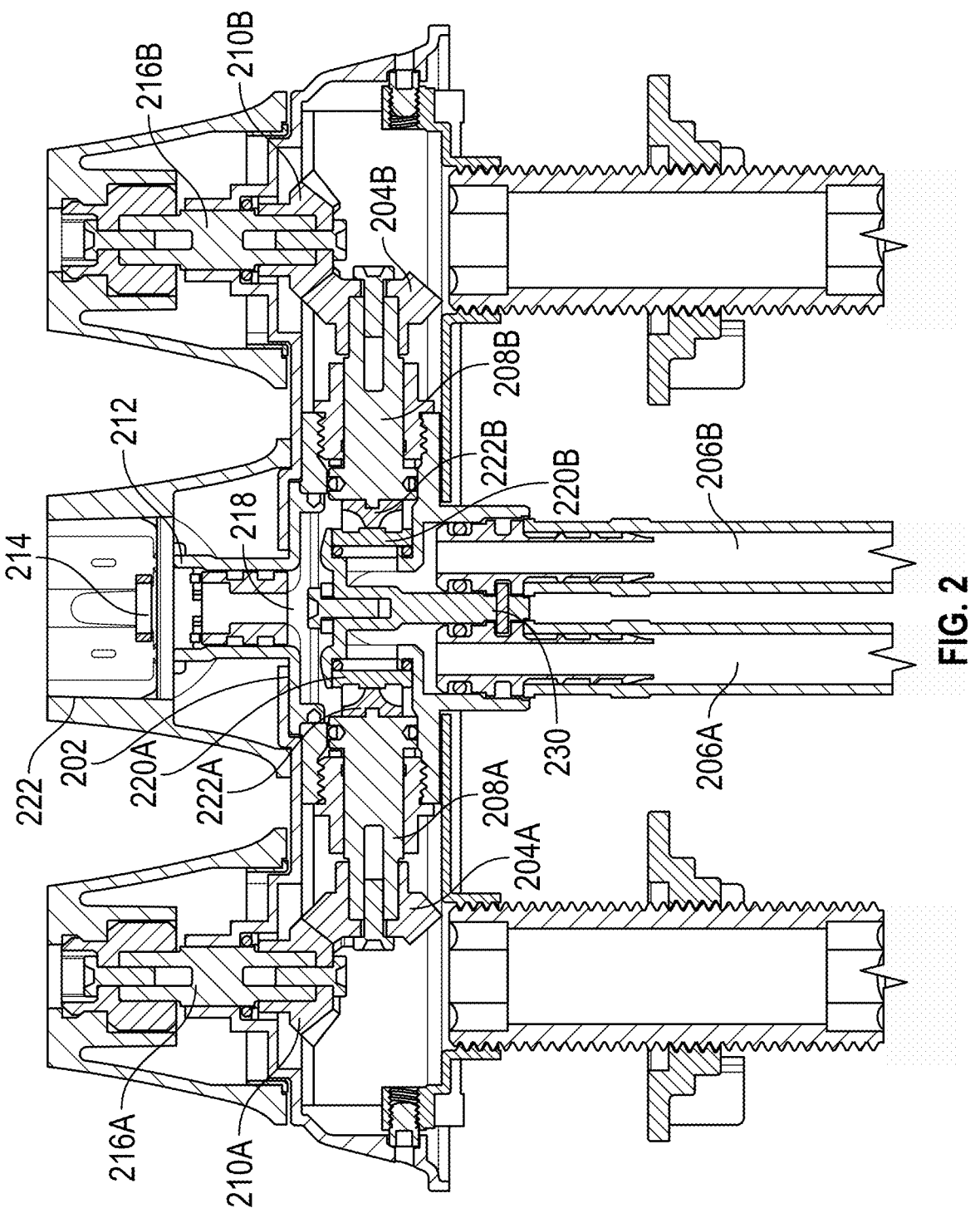
FIG. 2 shows a cross-sectional view of a dual control faucet system, according to some embodiments described herein.

FIG. 2 shows a cross-sectional view of a dual control faucet system 200, according to some embodiments described herein. As shown, the dual control faucet system comprises a faucet trim that includes a cold water control, a hot water control, and a faucet body 222. The valve assembly of the dual control faucet system 200 includes a cold water spindle 208A mechanically coupled to a cold water bevel gear 204A and a hot water spindle 208B mechanically coupled to a hot water bevel gear 204B. The system 200 also includes a cold water control system housed within the cold water control that includes a connector 216A coupled to a cold water control bevel gear 210A and a hot water control system housed within the hot water control that includes a connector 216B coupled to a hot water control bevel gear 210B. Also included are a manifold 202, a manifold outlet 212, a mixing chamber 218, a cold water supply 206A, a hot water supply 206B, and a clip 230 configured to hold cold water supply 206A and hot water supply 206B in place.

A rotatable ceramic disk 222A and a stationary ceramic disk 220A are positioned at a proximal end of the cold water spindle 208A. Similarly, a rotatable ceramic disk 222B and a stationary ceramic disk 220B are positioned at a proximal end of the hot water spindle 208B. The spindles (i.e., cold water spindle 208A and hot water spindle 208B) each rotate their respective ceramic disk relative to their respective stationary disk to control the opening or closing of the flow path.

In some embodiments, when the dual control faucet system 200 is mounted to a mounting surface (e.g., a deck), the manifold 202 may be partially located below a lower surface of the mounting surface and partially located above an upper surface of the mounting surface.

Connector 216A is connected at a first end to an interior surface of a cold water control (noy shown) and at a second end to the cold water control bevel gear 210A. When cold water control is turned, rotated, or otherwise manipulated by a user (i.e., receives an input from a user), it causes the connector 216A to also rotate proportionally to the rotation of the cold water control. The connector 216A may be mechanically coupled to an interior of the cold water control via a screw, in some embodiments. The rotation of the connector 216A can cause an identical rotation in the cold water control bevel gear 210A. Cold water control bevel gear 210A (or a "first bevel gear") is configured to rotate around a vertical axis. The cold water control bevel gear 210A is positioned at a 90 degree angle to a cold water bevel gear 204A (or a "third bevel gear") such that the teeth of the cold water control bevel gear 210A and the teeth of the cold water bevel gear 204A are in mesh or the cold water control bevel gear 210A is in mesh or coupled with the cold water bevel gear 204A. Therefore, the cold water bevel gear 204A is configured to rotate along a horizontal axis. The vertical axis of rotation of the cold water control bevel gear 210A is perpendicular to the horizontal axis of rotation of the cold water bevel gear 204A.

Because the cold water control bevel gear 210A is in mesh or coupled with the cold water bevel gear 204A, rotation of the cold water control bevel gear 210A causes rotation of the cold water bevel gear 204A. In some embodiments, rotation of the cold water control bevel gear 210A may cause an identical rotation of the cold water bevel gear 204A (i.e., a diameter of the cold water control bevel gear 210A may be the same as a diameter of the cold water bevel gear 204A). In some embodiments, the cold water control bevel gear 210A may be identical in size and shape to the cold water bevel gear 204A. In some embodiments, the cold water bevel gear 210A may be larger or smaller than the cold water bevel gear 204A.

When the cold water bevel gear 204A rotates, it causes rotation of the cold water spindle 208A, which is mechanically coupled to the cold water bevel gear 204A (e.g., with a screw). As shown, the cold water spindle 208A may be located entirely within the manifold 202, or partially within the manifold 202. The direction in which the user turns or rotates the cold water control (i.e., clockwise or counterclockwise) determines whether the cold water spindle 208A rotates in an opening direction or a closing direction. When rotated in an opening direction, the amount of cold water that enters the cartridge (comprising the cold water spindle 208A, rotatable ceramic disk 222A and stationary ceramic disk 220A) from the cold water supply 206A is increased. When rotated in a closing direction, the amount of cold water that enters the cartridge 208A from the cold water supply 206A is decreased. An increase in cold water decreases the temperature of the mixed water, and an decrease in cold water increases the temperature of the mixed water.

Connector 216B is connected at a first end to an interior surface of a hot water control and at a second end to the hot water control bevel gear 210B. When the hot water control is turned, rotated, or otherwise manipulated by a user (i.e., receives an input from a user), it causes connector 216B to also rotate proportionally to the rotation of the hot water control. In some embodiments, the connector 216B may be mechanically coupled to an interior of the hot water control via a screw. In some embodiments, the rotation of the connector 216B causes an identical rotation in the hot water control bevel gear 210B (i.e., identical in rotational distance). Hot water control bevel gear 210B (or a "third bevel gear") is configured to rotate around a vertical axis. The hot water control bevel gear 210B is positioned at a 90 degree angle to a hot water bevel gear 204B (or a "fourth bevel gear") such that the teeth of the hot water control bevel gear 210B and the teeth of the hot water bevel gear 204B are in mesh or the hot water control bevel gear 210B is in mesh or coupled with the hot water bevel gear 204B. Therefore, the hot water bevel gear 204B is configured to rotate along a horizontal axis. The vertical axis of rotation of the hot water control bevel gear 210B is perpendicular to the horizontal axis of rotation of the hot water bevel gear 204B. In some embodiments, the horizontal axes of rotation of the cold water spindle 208A and the hot water spindle 208B are identical. In some embodiments, the vertical axes of rotation of the cold water control bevel gear 210A and the hot water control bevel gear 210B are parallel. In some embodiments, the vertical axes of rotation of the cold water control bevel gear 210A and the hot water control bevel gear 210B are perpendicular to the horizontal axes of rotation of the cold water spindle 208A and the hot water spindle 208B.

Because the hot water control bevel gear 210B is in mesh with the hot water bevel gear 204B, rotation of the hot water control bevel gear 210B causes rotation of the hot water bevel gear 204B. In some embodiments, rotation of the hot water control bevel gear 210B may cause an identical rotation of the hot water bevel gear 204B (i.e., a distance of the hot water control bevel gear 210B may be the same as a diameter of the hot water bevel gear 204B). In some embodiments, the hot water control bevel gear 210B may be identical in size and shape to the hot water bevel gear 204B. In some embodiments, the hot water bevel gear 210B may be larger or smaller than the hot water bevel gear 204B.

Rotation of the hot water bevel gear 204B causes rotation of the hot water spindle 208B, which is mechanically coupled to the hot water bevel gear 204B (e.g., with a screw). The hot water spindle 208B may be located entirely within the manifold 202, or partially within the manifold 202. The direction in which a user turns or rotates the hot water control (i.e., clockwise or counterclockwise) determines whether the hot water spindle 208B rotates in an opening direction or a closing direction. In some embodiments, the opening direction is clockwise and the closing direction is counterclockwise. In some embodiments, the opening direction is counterclockwise and the closing direction is clockwise. When rotated in an opening direction, the amount of hot water that enters the cartridge (comprising the hot water spindle 208B, rotatable ceramic disk 222B and stationary ceramic disk 220B) from the hot water supply 206B is increased. When rotated in a closing direction, the amount of hot water that enters the cartridge from the hot water supply 206B is decreased. An increase in the amount of hot water that enters the cartridge will increase the temperature of the mixed water, and a decrease in the amount of hot water that enters the cartridge will decrease the temperature of the mixed water.

The hot water from the hot water cartridge and the cold water from the cold water cartridge each flow to the mixing chamber 218 of the manifold 202. In the mixing chamber 218, the hot water and cold water mix to form mixed temperature water. The relative temperature of the mixed temperature is controlled by the user, who can control the amount of cold water intake relative to the amount of hot water intake by controlling the cold water control and the hot water control, respectively. Once mixed, the mixed temperature water flows up and out of the manifold 202 via a manifold outlet 212 and into a faucet body 222 of the dual control faucet system 200. The mixed temperature water is then dispensed, or flows out of, an outlet of the faucet body 222. The manifold 202 may be removably connected to a base of the faucet body 222. In some embodiments, manifold 202 may be removably connected to a base of the faucet body 222 by a separate connector 214. In some embodiments, connector 214 is part of the outlet tube.

Figure 3:
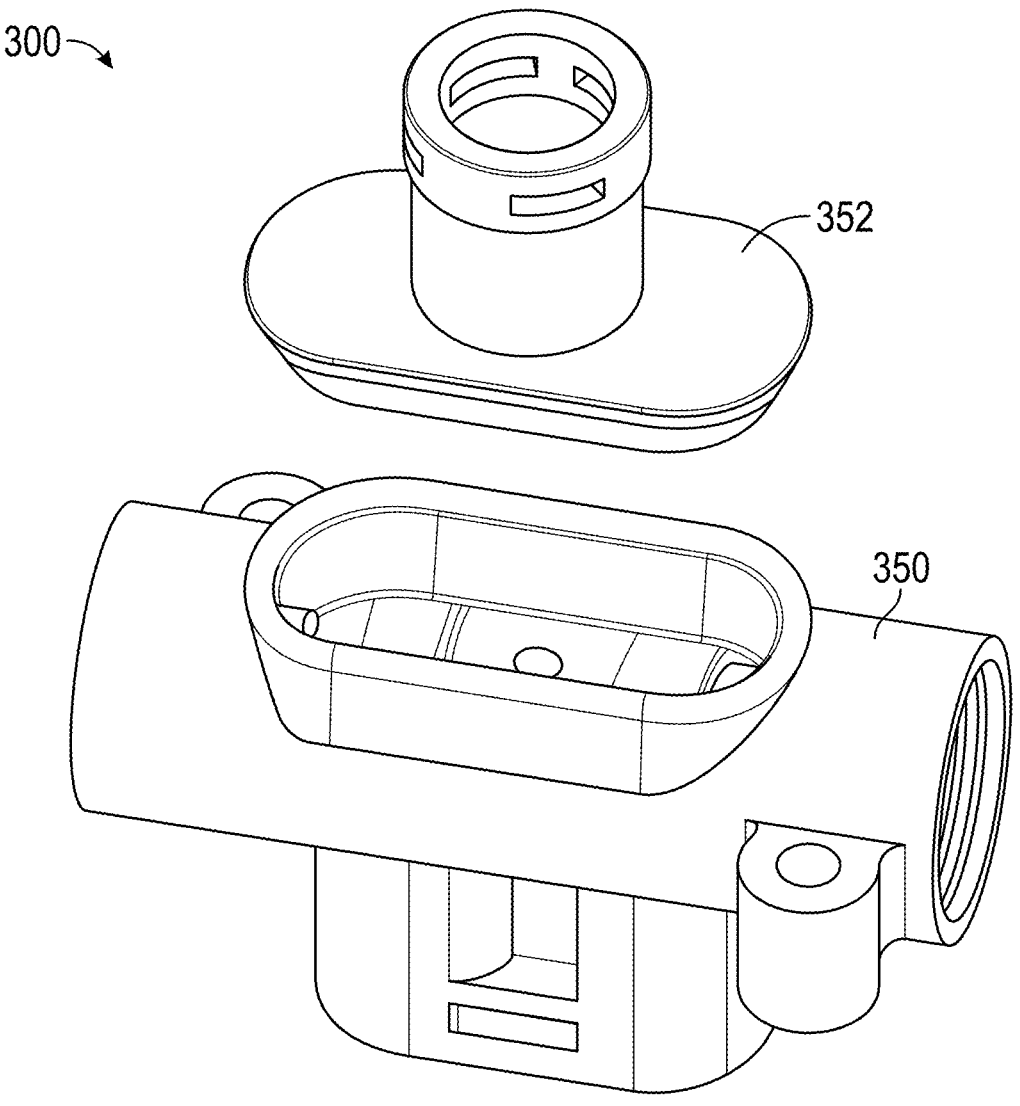
FIG. 3 shows a multiple piece manifold, according to some embodiments.

FIG. 3 shows a multiple piece manifold 300 according to some embodiments. As shown, the manifold 300 can include a main body 350 and an outlet cover 352. These parts of the manifold 300 may be fastened or welded together.

In some embodiments, the manifold may comprise a single part. For example, the manifold may be formed into a single part using an injection molding process.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A dual control faucet system comprising:
   a cold water control comprising a cold water control system housed within the cold water control, wherein the cold water control system comprises a first bevel gear;

a hot water control comprising a hot water control system housed within the hot water control, wherein the hot water control system comprises a second bevel gear;

a faucet body; and a valve assembly comprising a third bevel gear coupled to one end of a cold water spindle, a first rotatable disk and a first stationary disk positioned at another end of the cold water spindle, a fourth bevel gear coupled to one end of a hot water spindle, and a second rotatable disk and a second stationary disk positioned at another end of the hot water spindle, wherein the first bevel gear is meshed with the third bevel gear and the second bevel gear is meshed with the fourth bevel gear, wherein, when the cold water control receives an input from a user, the cold water control causes the first bevel gear to rotate, causing the third bevel gear to rotate, such that the cold water spindle rotates the first rotatable disk relative to the first stationary disk in an opening direction or in a closing direction to control a flow of cold water from a cold water supply and into a cold water cartridge of the valve assembly, and wherein, when the hot water control receives an input from a user, the hot water control causes the second bevel gear to rotate, causing the fourth bevel gear to rotate, such that the hot water spindle rotates the second rotatable disk relative to the second stationary disk in an opening direction or in a closing direction to control a flow of hot water from a hot water supply and into a hot water cartridge of the valve assembly.

2. The dual control faucet system of claim 1, wherein the first bevel gear and the second bevel gear are configured to rotate around a vertical axis and the second bevel gear and the fourth bevel gear are configured to rotate around a horizontal axis.

3. The dual control faucet system of claim 2, wherein the horizontal axis of rotation of the third bevel gear and the horizontal bevel gear of the fourth bevel gear are the same.

4. The dual control faucet system of claim 1, wherein, when the dual control faucet system is mounted to a mounting surface, the valve assembly is located below the mounting surface.

5. The dual control faucet system of claim 1, wherein the cold water control system comprises a connector coupled at a first end to an interior surface of the cold water control and at a second end to the first bevel gear.

6. The dual control faucet system of claim 1, wherein the hot water control system comprises a connector coupled at a first end to an interior surface of the hot water control and at a second end to the second bevel gear.

7. The dual control faucet system of claim 1, wherein the cold water spindle is configured to rotate around a horizontal axis and the hot water spindle is configured to rotate around a horizontal axis, wherein the horizontal axis of rotation of the cold water spindle and the horizontal axis of rotation of the hot water spindle are the same.

8. The dual control faucet system of claim 1, wherein at least a portion of the cold water spindle and a portion of the hot water spindle are positioned within a manifold.

9. The dual control faucet system of claim 8, wherein the manifold is configured to be detachably connected to a cold water supply and a hot water supply.

10. The dual control faucet system of claim 8, wherein the manifold comprises a mixing chamber configured to receive cold water from the cold water cartridge and hot water from the hot water cartridge to form mixed temperature water and an outlet, wherein the outlet is configured to be removably coupled to a base of the faucet body and deliver the mixed temperature water to the faucet body.

11. The dual control faucet system of claim 8, wherein, when the dual control faucet system is mounted to a mounting surface, the manifold is configured to be located partially above an upper surface of the mounting surface and partially below a lower surface of the mounting surface.

12. The dual control faucet system of claim 10, wherein the outlet of the manifold is configured to removably connect to the base of the faucet body via a separate connector.

13. The dual control faucet system of claim 8, wherein the manifold comprises an engineering thermoplastic.

14. The dual control faucet system of claim 1, wherein a diameter of the first bevel gear is the same as a diameter of the third bevel gear, and a diameter of the second bevel gear is the same as a diameter of the fourth bevel gear.

15. The dual control faucet system of claim 1, wherein a diameter of the first bevel gear is the same as a diameter of the second bevel gear, and a diameter of the third bevel gear is the same as a diameter of the fourth bevel gear.

* * * * *